US010282114B1

(12) United States Patent
Carlock (10) Patent No.: US 10,282,114 B1
(45) Date of Patent: May 7, 2019

(54) SYSTEM AND COMPUTER-IMPLEMENTED METHOD FOR BALANCING LOADS ACROSS DATA STORAGE POOLS

(71) Applicant: STATE FARM MUTUAL AUTOMOBILE INSURANCE COMPANY, Bloomington, IL (US)

(72) Inventor: Brent Carlock, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 25 days.

(21) Appl. No.: 15/466,293

(22) Filed: Mar. 22, 2017

(51) Int. Cl.
*G06F 12/00* (2006.01)
*G06F 3/06* (2006.01)

(52) U.S. Cl.
CPC .......... *G06F 3/0619* (2013.01); *G06F 3/0665* (2013.01); *G06F 3/0689* (2013.01); *G06F 3/061* (2013.01)

(58) Field of Classification Search
CPC ............... H04L 67/1002; H04L 47/125; H04L 67/1008; G06F 9/505; G06F 3/0619; G06F 3/0647; G06F 3/067; G06F 3/0689; G06F 3/0665
See application file for complete search history.

(56) References Cited

U.S. PATENT DOCUMENTS

| | | | | |
|---|---|---|---|---|
| 8,554,918 B1* | 10/2013 | Douglis | .............. | G06F 11/3485 707/640 |
| 2004/0044698 A1* | 3/2004 | Ebata | ..................... | G06F 3/0608 |
| 2009/0313445 A1* | 12/2009 | Pandey | ................. | G06F 9/4856 711/162 |
| 2009/0328050 A1* | 12/2009 | Liu | ........................ | G06F 9/5088 718/104 |
| 2013/0042003 A1* | 2/2013 | Franco | ................ | H04L 67/1097 709/226 |

OTHER PUBLICATIONS

"Microsoft Computer Dictionary", 2002, Microsoft Press, Fifth Edition, p. 315.*

* cited by examiner

*Primary Examiner* — Arvind Talukdar
(74) *Attorney, Agent, or Firm* — Hovey Williams LLP (57) ABSTRACT

A system and computer-implemented method for automatically balancing loads across two or more storage pools within a storage array, particularly with regard to storage capacity and/or performance utilization, in accordance with a user-instituted policy. A policy is activated and input criteria are specified. A current refresh date/time stamp is determined, and whether an active job is occurring is determined. A current operational (e.g., capacity or performance) percentage for each of storage pool is determined, pools with higher and pools with lower operational percentages are identified, and data is moved from the former to the latter to better balance the pools. If the pools are already closely balanced, no action is performed. The process is repeated at an interval specified in the set of input criteria. If multiple bases for balancing are selected, the process may alternate between them.

20 Claims, 2 Drawing Sheets

SYSTEM AND COMPUTER-IMPLEMENTED METHOD FOR BALANCING LOADS ACROSS DATA STORAGE POOLS

FIELD OF THE DISCLOSURE

The present disclosure generally relates to systems and methods for improving the functioning of storage arrays of electronic memories, and more particularly, to a system and computer-implemented method for automatically balancing loads across two or more storage pools within a storage array, particularly with regard to storage capacity and/or performance utilization, in accordance with user-instituted policies.

BACKGROUND

An enterprise class storage array includes multiple data storage pools for storing data, and each storage pool includes multiple disks. Each pool has finite capacity and performance capabilities. An out-of-balance capacity condition occurs when too much data is stored in one pool, and an out-of-balance performance condition occurs when too many read or write input/output operations per second (IOPS) or read or write transfers (Xfers) are made to or from one pool. If a pool is already being overused and a spike in workload occurs involving that pool, then there may be a slow-down or outage. Thus, it is generally desirable to balance, or "tune," resource usage across storage pools in order to better handle spikes in workload and thereby avoid outages.

Currently, a user interface notifies a user when a pool is out of balance, and the user then employs a manual procedure to migrate data from one pool to another in order to better balance pools across the array. This manual procedure consumes a large amount of time and resources analyzing reports, opening tasks, examining the capacities and performances of all of the pools to identify particular pools to which data could and should be migrated, creating plans to address the out-of-balance conditions, executing the plans, and monitoring the results.

BRIEF SUMMARY

Embodiments of the present technology provide a system and computer-implemented method for automatically balancing loads across two or more storage pools within a storage array, particularly with regard to storage capacity and/or performance utilization, in accordance with user-instituted policies. Embodiments advantageously automate the prior art manual balancing process, including automatically selecting a better pool for receiving data from an out-of-balance pool, and thereby greatly reduce the amount of time and resources required by the prior art process.

In a first aspect, a computer-implemented method may be provided for improving the functionality of a computer for substantially automatically balancing loads across two or more data storage pools within a data storage array in accordance with a user-instituted policy, and may broadly comprise the following performed by a computer. A user may be prompted to activate a policy for balancing the two or more data storage pools. The user may be prompted to specify a set of input criteria for use in balancing the two or more data storage pools. A current refresh date/time stamp may be determined for a software suite managing operation of the data storage array. Whether an active job is occurring may be determined for the data storage array, and if so, no action may be taken to balance the two or more data storage pools. A current operational percentage may be determined for each of the two or more data storage pools. A first data storage pool may be identified that has the highest operational percentage and a second data storage pool may be identified that has the lowest operational percentage. Data from the first data storage pool may be transferred to the second data storage pool to balance the two or more data pools. The process may be repeated at an interval specified in the set of input criteria.

In a second aspect, a system may be provided for substantially automatically balancing loads across two or more data storage pools within a data storage array in accordance with a user-instituted policy, and may broadly comprise an electronic memory element, an electronic processing element, and an electronic communications element. The electronic processing element may be configured to execute a software management suite for managing the storage array, and to execute a software module for balancing the two or more storage pools as follows. A user may be prompted to activate a policy for balancing the two or more data storage pools, and then the policy, may be stored in the electronic memory. The user may be prompted to specify a set of input criteria for use in balancing the two or more data storage pools, and then the set of input criteria may be stored in the electronic memory. A current refresh date/time stamp may be determined for a software suite managing operation of the data storage array. Whether an active job is occurring may be determined for the data storage array, and if so, no action may be taken to balance the two or more data storage pools. A current operational percentage may be determined for each of the two or more data storage pools. A first data storage pool may be identified that has the highest operational percentage and a second data storage pool may be identified that has the lowest operational percentage. Data may be moved from the first data storage pool to the second data storage pool to balance the two or more data pools. The process may be repeated at an interval specified in the set of input criteria. The electronic display may present a user interface configured to allow the user to activate the user-instituted policy and to specify the set of input criteria.

In a third aspect, a non-transitory computer readable storage medium with a computer program stored thereon may be provided for improving the functionality of a computer for substantially automatically balancing loads across two or more data storage pools within a data storage array in accordance with a user-instituted policy, wherein the computer program may instruct a system to perform the following. A user may be prompted to activate a policy for balancing the two or more data storage pools. The user may be prompted to specify a set of input criteria for use in balancing the two or more data storage pools. A current refresh date/time stamp may be determined for a software suite managing operation of the data storage array. Whether an active job is occurring may be determined for the data storage array, and if so, no action may be taken to balance the two or more data storage pools. A current operational percentage may be determined for each of the two or more data storage pools. A first data storage pool may be identified that has the highest operational percentage, and a second data storage pool may be identified that has the lowest operational percentage. Data may be moved from the first data storage pool to the second data storage pool to balance the two or more data pools. The process may be repeated at an interval specified in the set of input criteria.

Various implementations of any or all of the foregoing aspects may include any one or more of the following additional features. Activating the policy may involve selecting or modifying an existing policy or creating a new policy. Activating the policy may involve selecting capacity as a basis for balancing the two or more data storage pools, determining the current operation percentage may involve determining a current capacity percentage for each of the two or more data storage pools, and if the current capacity percentage of the first data pool is within five percent of the current capacity percentage of the second data pool, no action may be taken to balance the two or more data storage pools. Activating the policy may involve selecting performance as a basis for balancing the two or more data storage pools, and determining the current operation percentage may involve determining a current performance percentage for each of the two or more data storage pools, and if the current performance percentage of the first data pool is within ten percent of the current performance percentage of the second data pool, no action may be taken to balance the two or more data storage pools. Activating the policy may involve selecting capacity as a first basis and performance as a second basis for balancing the two or more data storage pools. The first basis and the second basis may not be used in a same interval but rather may be used in alternate intervals for balancing the two or more data storage pools.

An alert may be generated and the policy may be inactivated if a hardware failure or network problem occurs. The data storage array may contain four or more data storage pools, and the process may further include identifying a third data storage pool that has a second highest operational percentage and a fourth data storage pool that has a second lowest operational percentage, and moving data from the third data storage pool to the fourth data storage pool to further balance the four or more data pools.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

The Figures depict exemplary embodiments for purposes of illustration only. One skilled in the art will readily recognize from the following discussion that alternative embodiments of the systems and methods illustrated herein may be employed without departing from the principles of the technology described herein.

DETAILED DESCRIPTION

The present embodiments may relate to, inter alia, systems and methods facilitate evaluating the performance of a cognitive computing tool, and thereby better understanding the usage, performance, and additional training needs of the cognitive computing tool.

Broadly, certain embodiments of the present technology provide a system and computer-implemented method for automatically balancing loads across two or more storage pools within a storage array, particularly with regard to storage capacity and/or performance utilization, in accordance with user-instituted policies. Embodiments advantageously automate the prior art manual balancing process, including automatically selecting a better pool for receiving data from an out-of-balance pool, and thereby greatly reduce the amount of time and resources required by the prior art process.

In one embodiment, the present technology may be implemented as a software module configured for use with an otherwise existing software suite for managing operation of a storage array. For example, a software module may be configured for use with the Hitachi® Command Suite (HCS), which includes a Device Manager, a Tuning Manager, and a Tiered Storage Manager, for managing a Hitachi® Data Storage (HDS) Enterprise Class G-Series storage array. However, the present technology is not limited to this particular software suite or storage array, and could, for example, be configured for use with an IBM® Storage Volume Controller for managing an IBM® DS series storage array, or for use with substantially any other software suite and storage array involving multiple storage pools. Thus, although largely described herein for illustrative purposes as configured for use with HCS and HDS, the present technology is not limited thereto.

Relatedly, it should be noted that the present technology is not the dynamic tiering (block level) function provided by HCS. Dynamic tiering occurs within an individual pool, while the present technology occurs at a higher level than dynamic tiering and balances resources across multiple pools in a storage array. In further contrast to dynamic tiering, the present technology involves a storage administrator selecting and/or creating policies for managing the balancing process across all of the pools in the array. Thus, the present technology leverages the existing Tiered Storage Manager (which is part of HCS) to non-disruptively migrate virtual volumes (allocated logical devices) in the array.

Embodiments may provide an Auto Balance tab within the HCS (or other existing software suite) selectable to display all extant policies, including their statuses (active or inactive) and their details, concerning or relating to the automatic balancing process. Further, embodiments may provide an Auto Balance Policy button selectable to launch an Auto Balance Wizard application configured to facilitate creating new policies. Input fields for the Auto Balance Wizard may include "Select Storage Array," "Select Specific Storage Pools to Keep Balanced," "Select Auto Balance Criteria" (i.e., balance only based on capacity, balance only based on performance, or balance based on both), and "Select Auto Balance Alerting Option" (e.g., SMTP/SNMP/Command).

Input criteria for managing capacity may include "Max Storage Pool Usage %" and "Auto Balance Cadence." The "Max Storage Pool Usage %" input criteria may be a range of values from between one percent and ninety-nine percent. For example, if the selected value is eighty-five percent, then if any selected storage pool usage is eighty-five percent or higher, that pool is no longer a valid target for receiving additional data, and an alert may be generated via SMTP/SNMP/Command (PERL script). When all pools reach a used capacity of eighty-five percent, the policy may be inactivated to allow for sending additional data to the pools. The "Auto Balance Cadence" input criteria may be interval values such as six hours, twelve hours, or twenty-four hours, which determines how often the software module performs pre-checks and then executes HTSM migration jobs. In some embodiments, "Max Storage Pool Usage %" and "Auto Balance Cadence" may be required input criteria.

Input criteria for managing performance may include "Read/Write IOPS or Read/Write Xfer," "Dampening Value," and "Auto Balance Cadence." The "Read/Write IOPS or Read/Write Xfer" input criteria may be read IOPS, write IOPS, read Xfer, or write Xfer, and a value between one and ten million. For example, if write IOPS is selected and the number ten thousand is input, then if a storage pool reaches ten thousand write IOPS or more, the storage pool is no longer a valid target for receiving additional data, and an alert may be generated. The "Dampening Value" input criteria may be expressed as a number of occurrences within a number of intervals. For example, if one occurrence and one contiguous interval is specified, then if one or more pools reach the defined max write IOPS within one collect interval, the storage pool that breached the max value is no longer considered a valid target for receiving additional data until the aggregate pool write IOPS has returned to less than the max write IOPS threshold. The software module may default to a setting of one occurrence in one collect interval. The "Auto Balance Cadence" input criteria may be interval values such as six hours, twelve hours, or twenty-four hours, which determines how often the software module performs pre-checks and then executes HTSM migration jobs. In some embodiments, "IOPS or Xfer," "Dampening Value," and "Auto Balance Cadence" may be required input criteria.

Input criteria for managing performance may further include "Inactive Time Period," which may be a continuous or daily time period, during which the software module does not consider performance because the period is a known busy backup period. For example if the "Inactive Time Period" is specified to be between midnight and two o'clock in the morning, then the software module will not consider performance when performing the automatic balancing process between those hours.

I. EXEMPLARY SYSTEM

Figure 1:
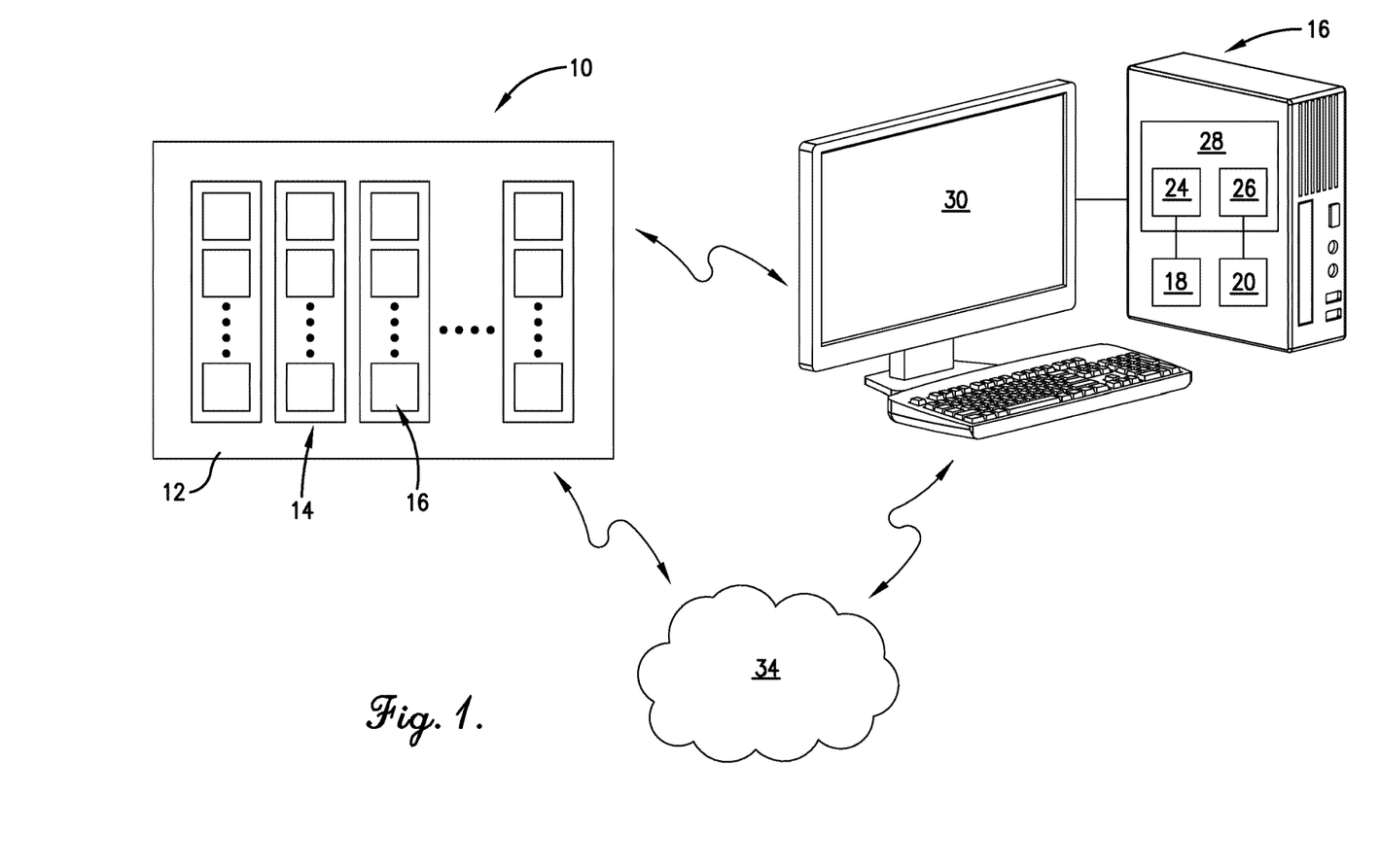
FIG. 1 is a block diagram of an embodiment of a system constructed in accordance with the present technology for automatically balancing loads across two or more storage pools within a storage array.

Referring to FIG. 1, an embodiment of an exemplary computer system 10 is shown for automatically balancing loads across two or more storage pools within a storage array, particularly with regard to storage capacity and/or performance utilization, in accordance with user-instituted policies. The system 10 may broadly comprise a storage array 12 containing two or more storage pools 14, and a computing device 16 for executing the existing software suite 18 and the software module 20 of the present technology for managing the storage array 12. The computing device 16 may include an electronic communications element 24; an electronic memory element 26; an electronic processing element 28; and an electronic display 30 for displaying a user interface, or "dashboard." An exemplary environment in which the system 10 may operate may include an electronic communications network 34.

The storage array 12 may be substantially any suitable enterprise class storage array, and the storage pools 14 may be substantially any suitable storage pools for storing data, and each storage pool may include multiple disks 36 or other individual memory elements. The computing device 16 may be substantially any suitable computing device (e.g., terminal, desktop, laptop, tablet, or smartphone) having the electronic memory element 26 configured to store a policy and other relevant data for use by the software module 20, the electronic processing element 28 configured to execute the existing software suite 18 and the software module 20 of the present technology for managing the storage array 12, and the electronic display 30 for presenting the user interface for facilitating such management. The computing device 16 may communicate with the storage array 12 directly or indirectly, via the electronic communications element 24 and, if remotely located, via the electronic communications network 34.

In more detail, the electronic communications element 24 may facilitate substantially any suitable form of communication between the storage array 12 and the computing device 16. Relatedly, the electronic communications network 34 may facilitate substantially any form of communication using substantially any standard or technology (e.g., GSM, CDMA, TDMA, WCDMA, LTE, EDGE, OFDM, GPRS, EV-DO, UWB, WiFi, IEEE 802 including Ethernet, WiMAX, and/or others). The electronic communications network 34 may also support various local area networks (LANs), personal area networks (PAN), or short range communications protocols. The electronic memory element 26 may facilitate substantially any suitable form of data storage such as volatile, non-volatile, fixed, and/or removable memory, including read-only memory (ROM), electronic programmable read-only memory (EPROM), random access memory (RAM), erasable electronic programmable read-only memory (EEPROM), and/or other hard drives, flash memory, MicroSD cards, and others. The electronic processing element 28 and electronic display may each employ substantially any suitable technology for performing their respective functions.

The existing software suite 18 may be configured to monitor, manage aspects, and communicate to a user regarding the operation of the storage array 12. The software module 20 of the present technology facilitates such management by allowing the user to activate, inactivate, and modify extant policies and create new policies, and implementing active policies to automatically balance storage capacity and/or performance utilization across the storage pools 14 within the storage array 12.

Figure 2:
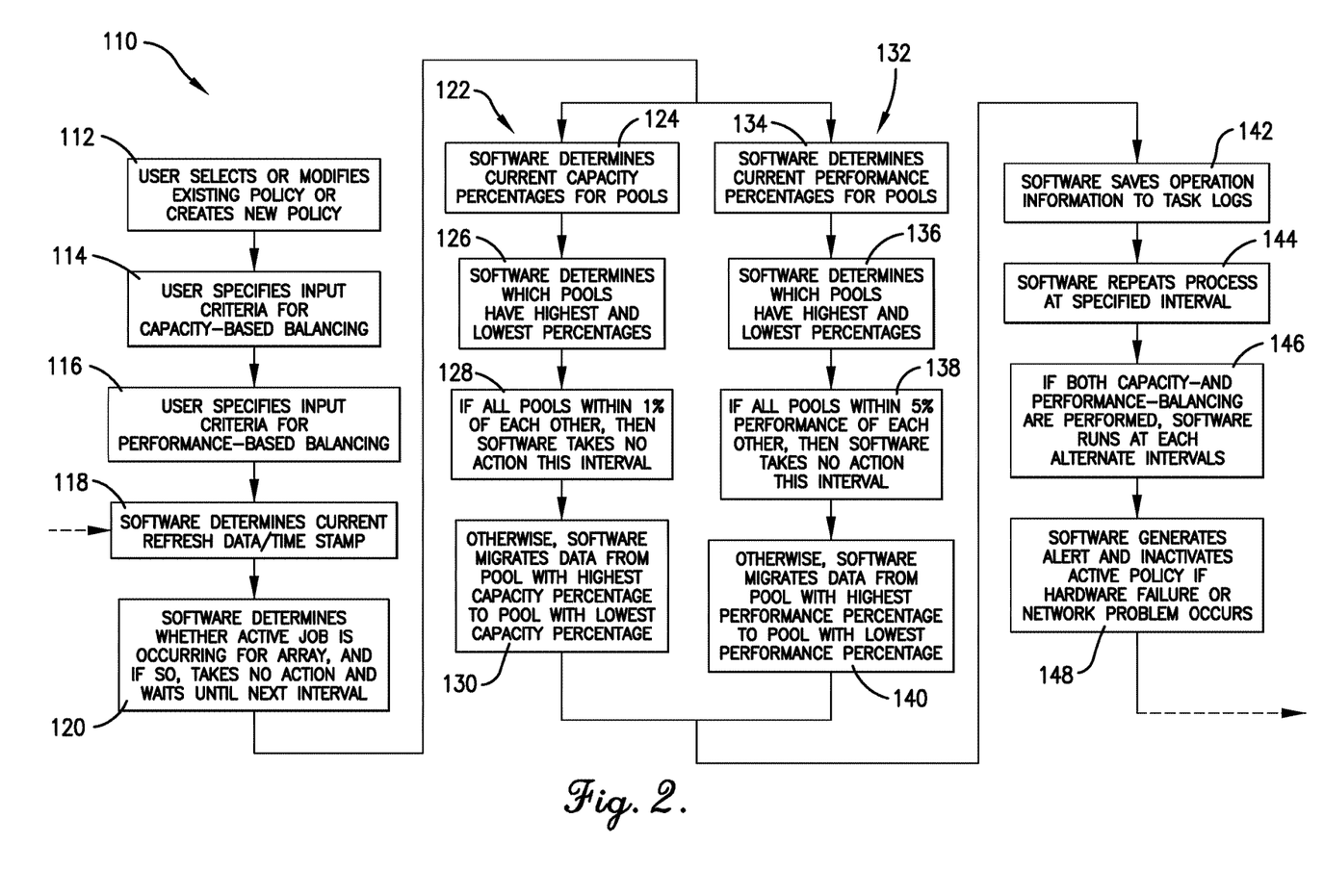
FIG. 2 is a flowchart of an embodiment of a computer-implemented method which may be implemented by the system of FIG. 1.

Referring also to FIG. 2, the system 10 may broadly function as follows. A user may use the computing device 16 to activate a policy for balancing the two or more data storage pools 14 of the storage array 12, as shown in 112. This may involve the user selecting or modifying an existing policy or creating a new policy specifying the particular storage array 12, specifying two or more storage pools 14 in the array 12 to balance, specifying a basis (i.e., capacity, performance, or both) for balancing them, and specifying how alerts may be communicated.

The user may specify a set of input criteria for use in capacity-based balancing the two or more data storage pools 14, as shown in 114. Specifying these input criteria may involve specifying a maximum capacity percentage above which a particular pool is no longer a valid target for receiving additional data and is a candidate for balancing, and specifying a time interval at which the balancing process is repeated.

The user may specify a set of input criteria for use in performance-based balancing the two or more data storage pools 14, as shown in 116. Specifying these input criteria may involve specifying a performance criteria (e.g., read/write IOPS/Xfers) and a number of operations above which a particular pool is no longer a valid target for receiving additional data and is a candidate for balancing, and specifying a time interval at which the balancing process is repeated.

The software module 20 executed by the processing element 28 may determine a current refresh date/time stamp for the software suite 18 which is also executed by the processing element 28, as shown in 118. If a successful refresh does not occur within an established time period, the software module 20 may generate an alert and inactivate the policy.

The software module 20 may determine whether an active job is occurring for the storage array 12, and if so, take no action and wait until the next interval, as shown in 120. This may involve determining whether any active hardware events and/or whether any active HTSM jobs are occurring for the storage array 12, and if so, generating an alert.

If the user specified capacity-based balancing, then the system 10 may proceed as follows. The software module 20 may determine a current capacity percentage for each storage pool 14 in the storage array 12, as shown in 124. This may involve collecting the current capacity percentages from the software suite 18. The software module 20 may determine which pools 14 have the highest and the lowest capacity percentages, as shown in 126. If all of the pools 14 are within five percent, or within one percent, capacity of each other (i.e., the pools are substantially balanced), then the software module 20 may take no balancing action during the current interval, as shown in 128. Otherwise, the software module 20 may move data from the pool with the highest capacity percentage to the pool with the lowest capacity percentage, as shown in 130.

If the user specified performance-based balancing, then the system 10 may proceed as follows. The software module 20 may determine a current performance percentage for each storage pool 14 in the storage array 12, as shown in 134. This may involve collecting the current performance percentages from the software suite 18. The software module 20 may determine which pools 14 have the highest and the lowest performance percentages, as shown in 136. If all of the pools 14 are within ten percent, or within five percent, performance of each other (i.e., the pools are substantially balanced), then the software module 20 may take no balancing action during the current interval, as shown in 138. Otherwise, the software module 20 may move data from the pool with the highest performance percentage to the pool with the lowest performance percentage, as shown in 140.

Regardless of the user-specified basis for balancing the pools 14, whether capacity-based or performance-based, the system 10 may continue as follows. The software module 20 may save operation information to a task log (e.g., the task logs of the software suite 18), as shown in 142. The software module 20 may repeat the process at the time interval specified by the user (e.g., six, twelve, or twenty-four hours), as shown in 144. If the user specified both capacity-based and performance-based balancing, then the software module 20 may run each in alternate intervals, as shown in 146. However, if capacity is within five percent, or within one percent, then the software module 20 may not wait the full interval to perform the performance-balancing process, and similarly, if performance is within ten percent, or within five percent, then the software module 20 may not wait the full period to perform the capacity-balancing process. If during the process there is a hardware failure or a network problem, the software module 20 may generate an alert and inactivate the active policy, as shown in 148.

The system 10 may include more, fewer, or alternative components and/or perform more, fewer, or alternative actions, including those discussed elsewhere herein, and particularly those discussed in the following section describing the computer-implemented method.

II. EXEMPLARY COMPUTER-IMPLEMENTED METHOD

Referring again to FIG. 2, an embodiment of computer-implemented method 110 is shown for improving the functioning of a computer for automatically balancing loads across two or more storage pools 14 within a storage array 12, particularly with regard to storage capacity and/or performance utilization, in accordance with user-instituted policies. The computer-implemented method 110 may be a corollary to the functionality of the system 10 of FIG. 1, and may be similarly implemented using the various components of the system 10 within the above-described exemplary operating environment. Broadly, the method 110 may proceed as follows.

A user may activate a policy for balancing the two or more data storage pools 14 in the storage array 12, as shown in 112. This may involve the user selecting or modifying an existing policy or creating a new policy specifying the particular storage array 12, specifying the two or more storage pools 14 to balance, specifying a basis (i.e., capacity, performance, or both) for balancing them, and specifying how alerts may be communicated (e.g., SMTP/SNMP/Command).

The user may specify a set of input criteria for use in capacity-based balancing the two or more data storage pools 14, as shown in 114. Specifying the input criteria may involve specifying a maximum capacity percentage above which a particular pool is no longer a valid target for receiving additional data and is a candidate for balancing. If an individual pool 14 exceeds the maximum capacity percentage, then an alert may be generated. If all of the pools 14 exceed the maximum capacity percentage, then an alert may be generated and the policy may be inactivated to allow for sending additional data to the pools 14. Specifying the input criteria may further include specifying a time interval (e.g., six, twelve, or twenty-four hours) at which the method is repeated.

The user may specify a set of input criteria for use in performance-based balancing the two or more data storage pools 14, as shown in 116. Specifying the input criteria may involve specifying a performance criteria (e.g., read IOPS, write IOPS, read Xfer, or write Xfer) and a number of operations (e.g., between one and ten million) above which a particular pool is no longer a valid target for receiving additional data and is a candidate for balancing. If an individual pool exceeds the maximum performance percentage, then an alert may be generated. If all pools 14 exceed the maximum performance percentage, then an alert may be generated and the policy may be inactivated to allow for sending additional data to the pools 14. Specifying the input criteria may further include specifying a time interval (e.g., six, twelve, or twenty-four hours) at which the method is repeated.

Additional input criteria may include a number of occurrences within a number of intervals. For example, if one occurrence and one contiguous interval is specified, then if one or more pools reach the defined max write IOPS within one collect interval, the storage pool that breached the max value is no longer considered a valid target for receiving additional data until the aggregate pool write IOPS has returned to less than the max write IOPS threshold. The software module 20 may default to a setting of one occurrence in one collect interval. Thus, unlike capacity-based balancing, performance-based balancing may track and consider the number of times the maximum performance percentage is exceeded in one or more intervals. Additional input criteria may include an inactive time period during which the software module does not consider performance because the period is a known busy backup period.

The software module 20 may determine a current refresh date/time stamp for the software suite 18, as shown in 118. If the refresh date/time is not within a first pre-established time period (e.g., twelve hours) of the polling time, the software module 20 may call the refresh script of the software suite 18, wait a second pre-established time period (e.g., twenty minutes), and poll again. If a successful refresh does not occur within the second pre-established time period or less, the software module 20 may generate an alert and inactive the policy.

The software module 20 may determine whether an active event or job is occurring for the storage array 12, and if so, take no action and wait until the next interval, as shown in 120. This may involve determining whether any active hardware events and/or whether any active HTSM jobs are occurring for the storage array 12, and if so, generating an alert and taking no action during the current interval.

If the user specified capacity-based balancing, then the system 10 may proceed along the capacity-balancing path 122 as follows. The software module 20 may determine a current capacity percentage for each storage pool 14 in the storage array 12, as shown in 124. This may involve collecting the current capacity percentages from the software suite 18. The software module 20 may determine which pools 14 have the highest and the lowest capacity percentages, as shown in 126. If all of the pools 14 are within five percent, or within one percent, capacity of each other (i.e., the pools are substantially balanced), then the software module 20 may take no balancing action during the current interval, as shown in 128. Otherwise, the software module 20 may move data from the pool with the highest capacity percentage to the pool with the lowest capacity percentage, as shown in 130.

If the user specified performance-based balancing, then the system 10 may proceed along the performance-balancing path 132 as follows. The software module 20 may determine a current performance percentage for each storage pool 14 in the storage array 12, as shown in 134. This may involve collecting the current performance percentages from the software suite 18. The software module 20 may determine which pools 14 have the highest and the lowest performance percentages, as shown in 136. If all of the pools 14 are within ten percent, or within five percent, performance (i.e., read/write IOPS/Xfers) of each other (i.e., the pools are substantially balanced), then the software module 20 may take no balancing action during the current interval, as shown in 138. The software module 20 may collect the performance data for the storage pools 14 every hour so as to have multiple data points over the interval (e.g., twenty-four data points over a twenty-four hour interval period). Otherwise, the software module 20 may move data from the pool with the highest performance percentage to the pool with the lowest performance percentage, as shown in 140.

In one implementation, step 124 may involve the software module 20 polling HiRDB every twenty-four hours to identify and maintain a list of the 8 disks with the highest capacity percentage per storage pool. Similarly, step 134 may involve the software module 20 polling both HiRDB and the HTNM Agent store every twenty-four hours to identify and maintain a list of the 8 disks with the highest performance percentage (for the type of performance specified by the Read/Write IOPS or Read/Write Xfer input criteria) per storage pool. The output of each subroutine may be the identities of at least two disks in need of balancing for the HTSM plan.

Regardless of the user-specified basis for balancing the pools 14, whether capacity-based or performance-based, the method 110 may continue as follows. The software module 20 may save operation information to a task log (e.g., the task logs of the software suite 18), as shown in 142. The operation information may include an HTSM job number, plan details, date and time, start and completion times, and the elapsed time. The software module 20 may repeat the method 110 at the time interval specified by the user (e.g., six, twelve, or twenty-four hours), as shown in 144.

If the user specified both capacity-based and performance-balancing, then the software module 20 may perform the capacity-balancing path 122 during one interval, and then run the performance-balancing path 132 during the next interval, and thereafter continue alternating the paths 122, 132. However, if capacity is within five percent, or within one percent, then the software module 20 may not wait the full period (e.g., six, twelve, or twenty-four hours) to run the performance-balancing path 132, and similarly, if performance is within ten percent, or within five percent, then the software module 20 may not wait the full period to run the capacity-balancing path 122. If during the process there is a hardware failure or a network problem, the software module 20 may generate an alert and inactivate the active policy, as shown in 148.

The computer-implemented method 110 may include more, fewer, or alternative actions, including those discussed elsewhere herein.

III. EXEMPLARY COMPUTER-READABLE MEDIUM

Referring again to FIGS. 1 and 2, an embodiment of a non-transitory computer-readable medium with an executable computer program stored thereon may be provided for automatically balancing loads across two or more storage pools 14 within a storage array 12, particularly with regard to storage capacity and/or performance utilization, in accordance with user-instituted policies. The non-transitory computer-readable medium with the executable computer program stored thereon may make use of the various components of the system 10 within the above-described exemplary operating environment, and may broadly instruct the processing element 28 and other components of the system 10 to perform or facilitate performing the method 110.

V. ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor implemented. For example, at least some of the operations of a method may be performed by one or more processors or processor-implemented hardware modules. The performance of certain operations may be distributed among the one or more processors, not only residing within a single machine, but deployed across a number of machines. In some exemplary embodiments, the processor or processors may be located in a single location (e.g., within a home environment, an office environment or as a server farm), while in other embodiments the processors may be distributed across a number of locations.

The performance of certain operations may be distributed among the one or more processors, not only residing within a single machine, but deployed across a number of machines. In some exemplary embodiments, the one or more processors or processor implemented modules may be located in a single geographic location (e.g., within a home environment, an office environment, or a server farm). In other exemplary embodiments, the one or more processors or processor-implemented modules may be distributed across a number of geographic locations.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112, sixth paragraph.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

I claim:

1. A computer-implemented method for improving the functionality of a computer for managing the operation of a data storage array containing two or more data storage pools, wherein a user has activated a policy for balancing the two or more data storage pools and the user has specified a set of input criteria for use in balancing the two or more data storage pools, the computer-implemented method comprising the following actions performed by the computer:
   (1) accessing the policy from an electronic memory;
   (2) accessing the set of input criteria from an electronic memory;
   (3) determining a current refresh date/time stamp for a software suite managing operation of the data storage array;
   (4) determining whether an active job is occurring for the data storage array, and if so, taking no action to balance the two or more data storage pools;
   (5) determining a current operational percentage for each of the two or more data storage pools;
   (6) identifying a first data storage pool that has the highest operational percentage and a second data storage pool that has the lowest operational percentage;
   (7) moving data from the first data storage pool to the second data storage pool to balance the two or more data pools;
   wherein the moving of data to balance the two or more storage pools involves transferring data from the first data storage pool to the second data storage pool until the current operational percentage of the first data storage pool is within a predetermined range of the current operational percentage of the second data storage pool, at which point the movement of data is suspended between the storage pools, wherein the predetermined range is set within the policy;
   and (8) repeating steps (3)-(7) at an interval specified in the set of input criteria.

2. The computer-implemented method as set forth in claim 1, wherein determining the current operational percentage involves determining a current capacity percentage for each of the two or more data storage pools.

3. The computer-implemented method as set forth in claim 2, wherein if the current capacity percentage of the first data pool is within five percent of the current capacity percentage of the second data pool, no action is taken to balance the two or more data storage pools.

4. The computer-implemented method as set forth in claim 1, wherein determining the current operational percentage involves determining a current performance percentage for each of the two or more data storage pools.

5. The computer-implemented method as set forth in claim 4, wherein if the current performance percentage of the first data pool is within ten percent of the current performance percentage of the second data pool, no action is taken to balance the two or more data storage pools.

6. A computer-implemented method for improving the functionality of a computer for balancing loads across two or more data storage pools within a data storage array in accordance with a user-instituted policy, the computer-implemented method comprising the following actions performed by the computer: (1) prompting a user to activate a policy for balancing the two or more data storage pools; (2) prompting the user to specify a set of input criteria for use in balancing the two or more data storage pools; (3) determining a current refresh date/time stamp for a software suite managing operation of the data storage array; (4) determining whether an active job is occurring for the data storage array, and if so, taking no action to balance the two or more data storage pools; (5) determining a current operational percentage for each of the two or more data storage pools; (6) identifying a first data storage pool that has the highest operational percentage and a second data storage pool that has the lowest operational percentage; (7) moving data from the first data storage pool to the second data storage pool to balance the two or more data pools;
   wherein the move of data to balance the two or more storage pools involves the transfer of data from the first data storage pool to the second data storage pool until the current operational percentage of the first data storage pool is within a predetermined range of the current operational percentage of the second data storage pool, at which point the movement of data is suspended between the storage pools, wherein the predetermined range is set within the policy;
   and (8) repeating steps (3)-(7) at an interval specified in the set of input criteria.

7. The computer-implemented method as set forth in claim 6, wherein activating the policy involves selecting or modifying an existing policy or creating a new policy.

8. The computer-implemented method as set forth in claim 6, wherein activating the policy involves selecting capacity as a basis for balancing the two or more data storage pools, and determining the current operation percentage involves determining a current capacity percentage for each of the two or more data storage pools.

9. The computer-implemented method as set forth in claim 8, wherein if the current capacity percentage of the first data pool is within five percent of the current capacity percentage of the second data pool, no action is taken to balance the two or more data storage pools.

10. The computer-implemented method as set forth in claim 6, wherein activating the policy involves selecting performance as a basis for balancing the two or more data storage pools, and wherein determining the current operation percentage involves determining a current performance percentage for each of the two or more data storage pools.

11. The computer-implemented method as set forth in claim 10, wherein if the current performance percentage of the first data pool is within ten percent of the current performance percentage of the second data pool, taking no action to balance the two or more data storage pools.

12. The computer-implemented method as set forth in claim 6, wherein activating the policy involves selecting capacity as a first basis and performance as a second basis for balancing the two or more data storage pools.

13. The computer-implemented method as set forth in claim 12, wherein the first basis and the second basis are not used in a same interval but rather are used in alternate intervals for balancing the two or more data storage pools.

14. The computer-implemented method as set forth in claim 6, further including generating an alert and inactivating the policy if a hardware failure or network problem occurs.

15. The computer-implemented method as set forth in claim 6, wherein the data storage array contains four or more data storage pools, the computer-implemented method further including—
   identifying a third data storage pool that has a second highest operational percentage and a fourth data storage pool that has a second lowest operational percentage; and
   moving data from the third data storage pool to the fourth data storage pool to further balance the four or more data pools.

16. A system for balancing loads across two or more data storage pools within a data storage array in accordance with a user-instituted policy, the system comprising an electronic memory element containing the user-instituted policy and a set of input criteria for use in balancing the two or more data storage pools; an electronic processing element configured to execute a software management suite for managing the storage array, and to execute a software module for balancing the two or more storage pools, wherein the software module causes the electronic processing element to:
   (1) access the user-instituted policy from the electronic memory element,
   (2) access the set of input criteria from the electronic memory element, (3) determine a current refresh date/time stamp for the software management suite, (4) determine whether an active job is occurring for the data storage array, and if so, taking no action to balance the two or more data storage pools, (5) determine a current operational percentage for each of the two or more data storage pools, (6) identify a first data storage pool that has the highest operational percentage and a second data storage pool that has the lowest operational percentage, (7) move data from the first data storage pool to the second data storage pool to balance the two or more data pools;
   wherein the move of data to balance the two or more storage pools involves the transfer of data from the first data storage pool to the second data storage pool until the current operational percentage of the first data storage pool is within a predetermined range of the current operational percentage of the second data storage pool, at which point the movement of data is suspended between the storage pools, wherein the predetermined range is set within the policy;
   and (8) repeat steps (3)-(7) at an interval specified in the set of input criteria; and an electronic display presenting a user interface configured to allow a user to activate the user-instituted policy and to specify the set of input criteria.

17. The system as set forth in claim 16, wherein determining the current operational percentage involves determining a current capacity percentage for each of the two or more data storage pools.

18. The system as set forth in claim 17, wherein if the current capacity percentage of the first data pool is within five percent of the current capacity percentage of the second data pool, no action is taken to balance the two or more data storage pools.

19. The system as set forth in claim 16, wherein determining the current operational percentage involves determining a current performance percentage for each of the two or more data storage pools.

20. The system as set forth in claim 19, wherein if the current performance percentage of the first data pool is within ten percent of the current performance percentage of the second data pool, no action is taken to balance the two or more data storage pools.

* * * * *